(12) United States Patent
Abebe

(10) Patent No.: US 7,869,625 B2
(45) Date of Patent: *Jan. 11, 2011

(54) REAL-TIME REMOTE IMAGE CAPTURE SYSTEM

(75) Inventor: Muguleta S. Abebe, Decatur, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/615,911

(22) Filed: Nov. 10, 2009

(65) Prior Publication Data

US 2010/0054552 A1 Mar. 4, 2010

Related U.S. Application Data

(63) Continuation of application No. 10/126,868, filed on Apr. 19, 2002, now Pat. No. 7,627,143.

(51) Int. Cl.
*G06K 9/00* (2006.01)
*G06T 1/00* (2006.01)
*G06T 7/00* (2006.01)

(52) U.S. Cl. .................. 382/115; 340/5.53; 340/5.83; 713/186; 902/3

(58) Field of Classification Search ......... 382/115–127; 283/68, 69, 78; 340/5.1, 5.2, 5.52, 5.53, 340/5.8–5.86; 356/71; 713/186; 902/3
See application file for complete search history.

(56) References Cited

U.S. PATENT DOCUMENTS

| | | | |
|---|---|---|---|
| 5,544,225 A | 8/1996 | Kennedy | |
| 5,587,560 A | 12/1996 | Crooks et al. | |
| 6,002,783 A | 12/1999 | Obata | |
| 6,016,476 A | 1/2000 | Maes | |
| 6,069,968 A | 5/2000 | Shaw | |
| 6,325,285 B1 | 12/2001 | Baratelli | |
| 6,430,305 B1 | 8/2002 | Decker | |
| 6,728,881 B1 | 4/2004 | Karamchetty | |
| 6,792,287 B1 | 9/2004 | Tuomela | |
| 7,190,817 B1 | 3/2007 | Schneider et al. | |
| 7,284,266 B1 | 10/2007 | Morris et al. | |
| 7,415,141 B2 | 8/2008 | Okazaki | |
| 7,627,143 B1 | 12/2009 | Abebe | |
| 2003/0156740 A1 | 8/2003 | Siegel et al. | |
| 2003/0212893 A1 | 11/2003 | Hind et al. | |

*Primary Examiner*—Aaron W Carter
(74) *Attorney, Agent, or Firm*—Thomas, Kayden, Horstemeyer & Risley, LLP

(57) ABSTRACT

Systems for remotely verifying the identity of an image include an identity capture device adapted to communicate with a computing device and a database. The identity capture device captures an image, and the computing device searches the database for information to authenticate and verify the image. For remotely connected computing devices, a communications network provides communication between the computing devices and the database. Other systems and methods are also provided.

20 Claims, 11 Drawing Sheets

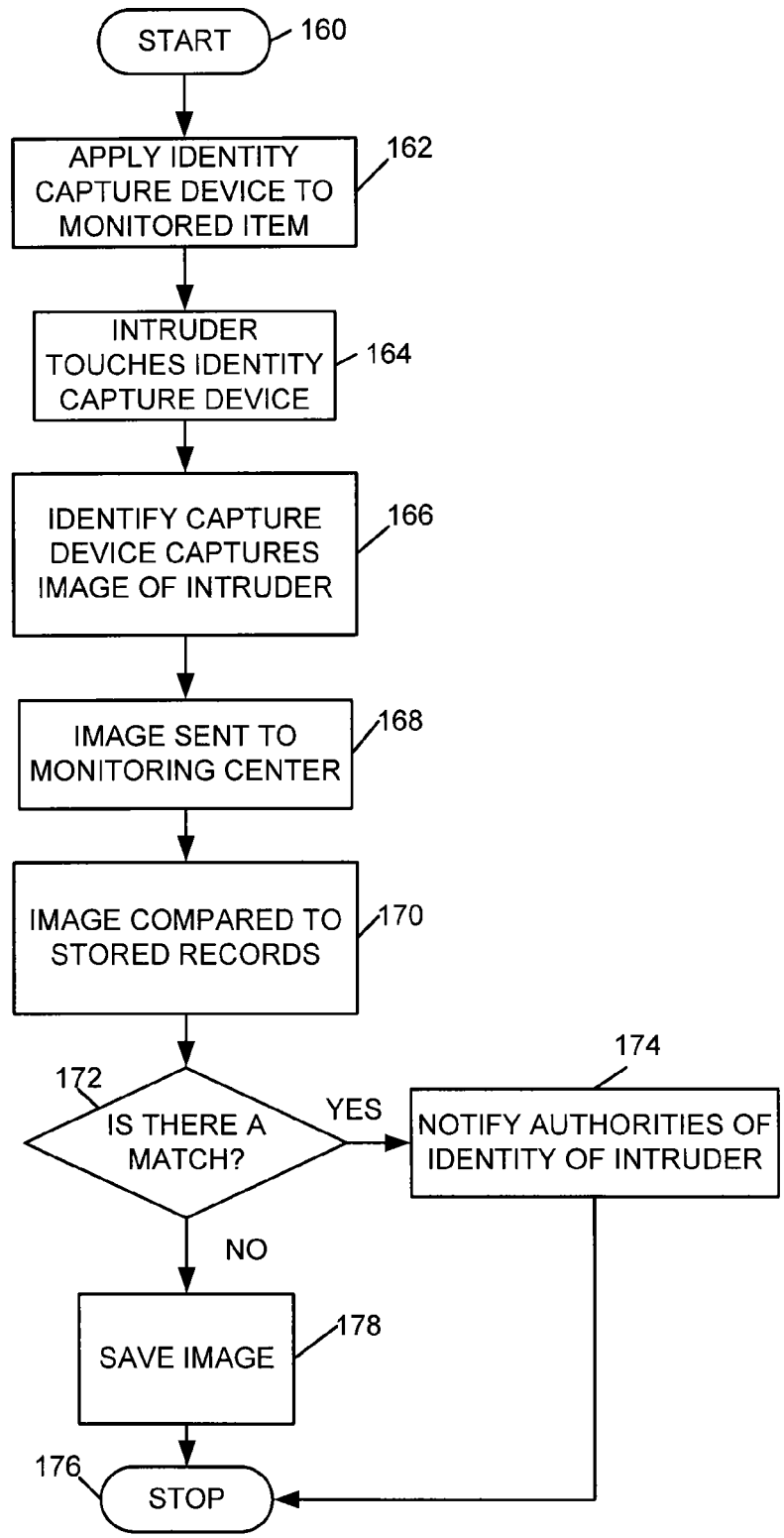

REAL-TIME REMOTE IMAGE CAPTURE SYSTEM

CROSS-REFERENCE TO RELATED APPLICATION

This application is a continuation of U.S. utility application entitled, "Real-Time Remote Image Capture System," having Ser. No. 10/126,868, filed Apr. 19, 2002, now U.S. Pat. No 7,627,143, which is entirely incorporated herein by reference.

TECHNICAL FIELD

The present invention is generally related to signature capture device systems and, more particularly, is related to the real-time remote capture and verification of an image.

BACKGROUND OF THE INVENTION

In today's environment, it is important to authenticate and verify the identity of an individual in a number of situations. For instance, the Internet allows customers to purchase goods and services in a manner that is remote from the seller of such goods. Typically, the sellers provide their customers the option to pay for a purchase by a credit card. To complete a transaction, the purchaser usually enters credit card information on an electronic form provided by the seller on a web page.

The seller then determines the authenticity of the purchaser's credit card information. The seller's processes may include verifying that the credit card is valid, or verifying that the purchase will not exceed the credit limit for the credit card. Further, the seller may verify the credit card number and the associated billing address for the credit card holder are correct. Often, the seller is unable to determine if the purchaser is the valid owner of the credit card in a remote sales transaction. This is difficult to determine because if the unauthorized person can provide the billing information, normally, the purchase will be approved.

Other situations where it is would be helpful to identify an individual include identifying someone in a life-threatening situation, such as for law enforcement personnel and emergency medical workers. Further, it would be helpful if an intruder could be quickly identified during or shortly after the commission or attempted commission of a crime. In addition, it would be useful for law enforcement to have a mechanism for identifying individuals who use weapons to commit crimes.

Thus, a heretofore-unaddressed need exists for a solution that addresses the aforementioned deficiencies and inadequacies.

SUMMARY OF THE INVENTION

Briefly described, in architecture, one preferred embodiment of the system, among others, can be implemented as follows. A system for remotely verifying the identity of an image comprises an identity capture device that is operatively coupled to at least one computing device. The identity capture device is adapted to capture the image. The system includes a database accessible by the computing device that has information for authenticating and verifying the image. A communications network is operatively coupled to the computing device and provides communication between a plurality of processing devices and the database.

The preferred embodiment of the present invention can also be viewed as providing methods for verifying an image. In this regard, one embodiment of such a method, among others, can be broadly summarized by the following steps: capturing the image using an identity capture device, accessing a database having authentication information for verifying the image, and comparing the image captured by the identity capture device with the authentication information in the database.

Other systems, methods, features, and advantages of the present invention will be or become apparent to one with skill in the art upon examination of the following drawings and detailed description. It is intended that all such additional systems, methods, features, and advantages be included within this description, and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 11 is a flow chart depicting a preferred embodiment of an image capture system implemented to identify an intruder.

DETAILED DESCRIPTION

Disclosed herein are systems and methods for the real-time remote capture of an image. To facilitate description of the inventive system, an example device that can be used to implement the systems and methods for remotely capturing an image on a personal computer or other device is discussed with reference to the figures. Although this system is described in detail, it will be appreciated that this system is provided for purposes of illustration only and that various modifications are feasible without departing from the inventive concept. After the example system has been described, an example of the operation of the system will be provided to explain the manner in which the system can be used to remotely capture an image.

Figure 1:
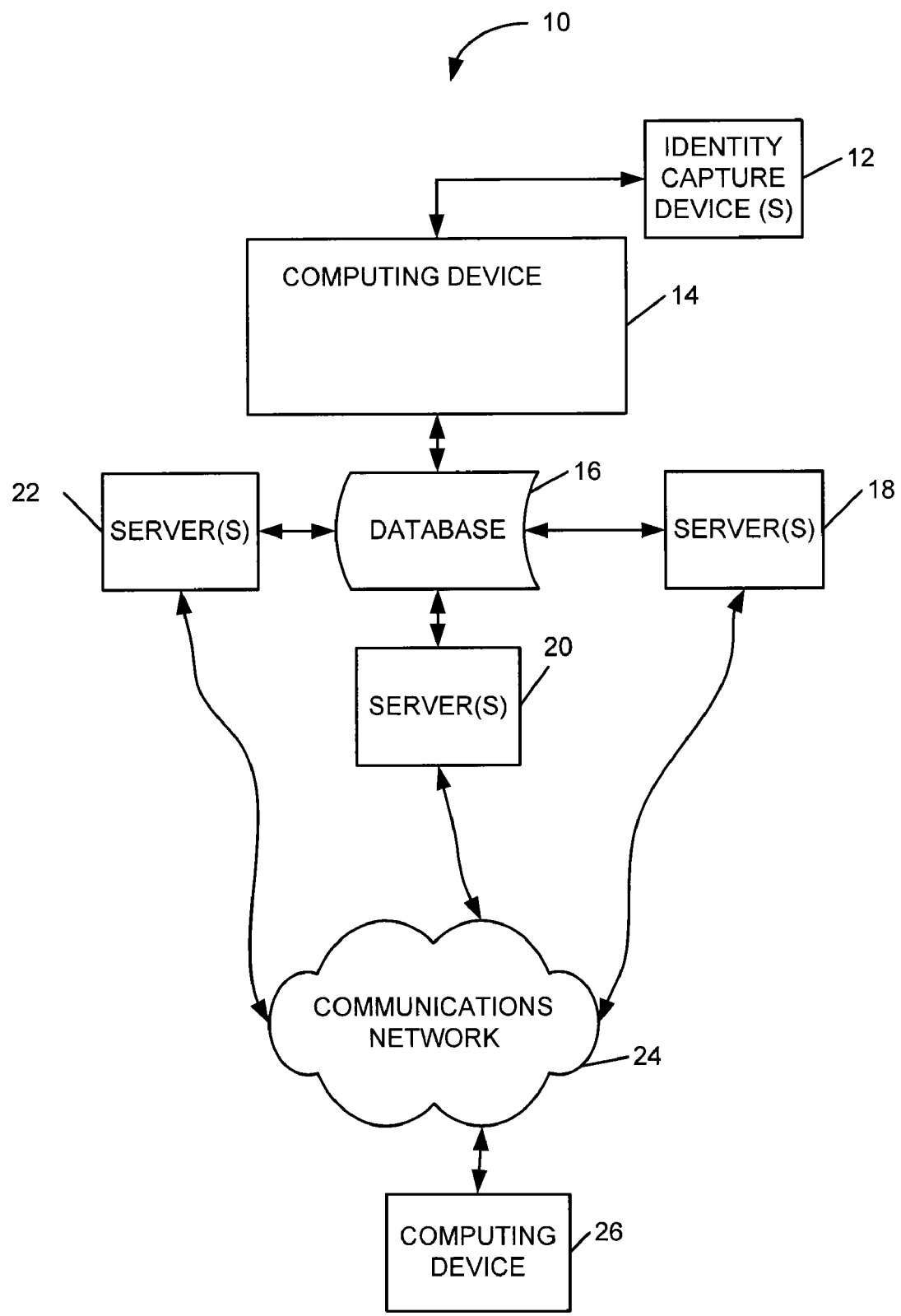
FIG. 1 is a block diagram depicting a preferred embodiment of an image capture system in accordance with one aspect of the present invention.

Referring now in more detail to the drawings, in which like numerals indicate corresponding parts throughout the several views, FIG. 1 is a block diagram of a preferred embodiment of an image capture system 10 in accordance with one aspect of the present invention. The image capture system 10 includes an identity capture device 12 operatively coupled to a computing device 14, such as a personal computer. In an alternative embodiment, the identity capture device 12 is incorporated in the computing device 14, and in other embodiments, a communications network 24 is interposed between the identity capture device and the computing device 14. The computing device 14 couples to a database 16 that includes authentication and verification information. In an alternative embodiment, the database 16 is incorporated in the computing device 14.

A plurality of servers 18, 20 and 22 may couple to the database 16 and the communications network 24. In an alternative embodiment, the database 16 couples directly to the communications network 24. Another computing device 26 can couple to the communications network 24. The communications network 24 is adapted to communicate between the database 16, servers 18, 20 and 22, and the computing device 14. In an alternative embodiment, the second computing device 26 has an identity capture device 12 coupled to the computing device 26.

The image capture system 10 provides for capturing images by use of an identity capture device 12, and verifying the authenticity of that image. The identity capture device 12 can encompass a touch-screen or touch sensitive display device or pad. In one embodiment, the image captured is a signature. In another embodiment, the image captured is a fingerprint. In yet another embodiment, the image capture system 10 provides for an interactive exchange among users connected to the image capture system 10. In still another embodiment of the invention, the identity capture device 12 affixes to a device worn by a person, such as a law enforcement officer or emergency medical worker. In the event of an emergency, the worker touches the identity capture device 12 to create an image, and the image is transmitted to a monitoring center where the image is used to identify the person who touched the identity capture device 12.

Figure 2:
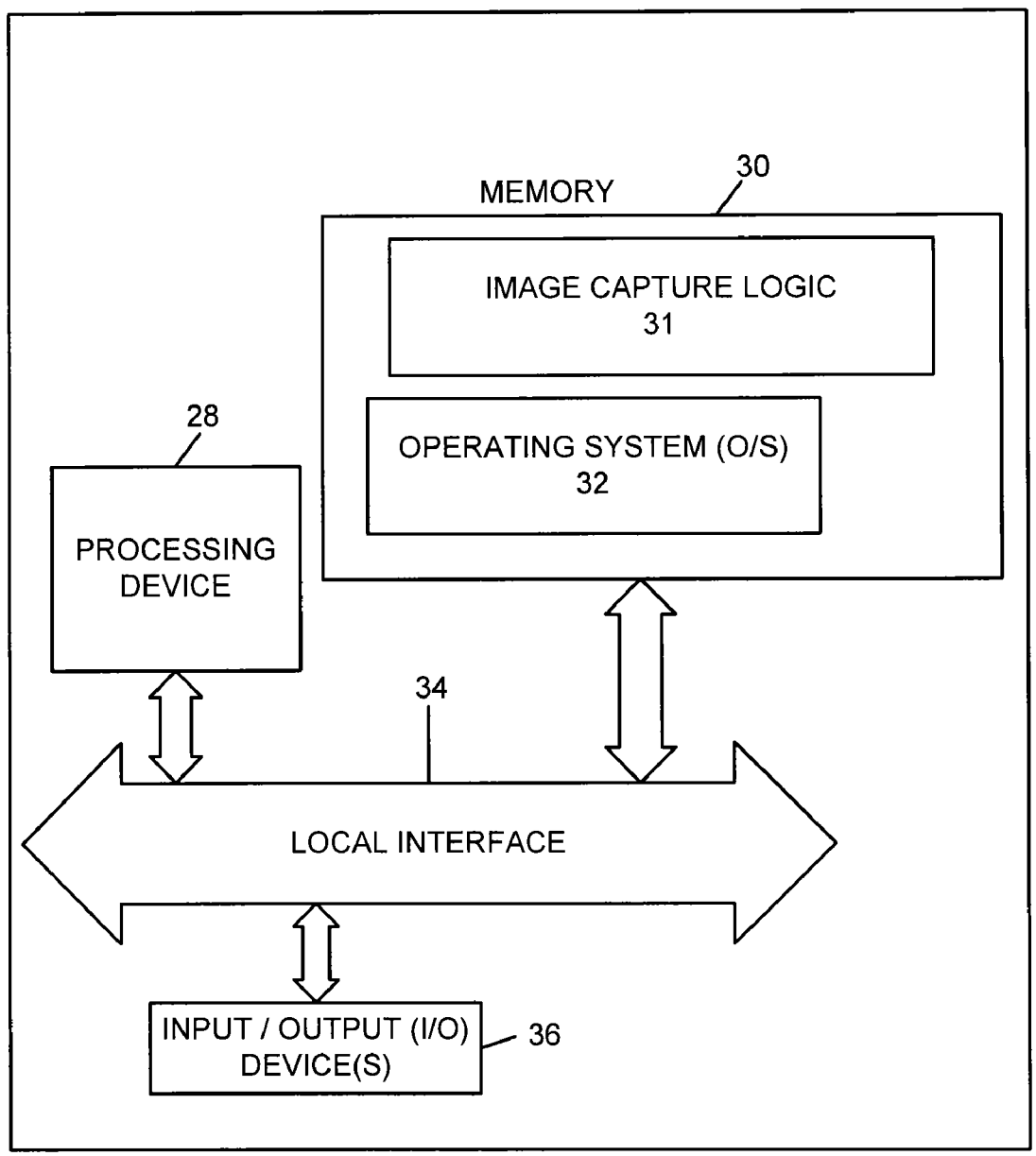
FIG. 2 is a block diagram depicting a computer or processor-based system that can be used to implement a preferred embodiment of the image capture system.

As shown in FIG. 2, image capture logic 31 can be implemented in software (e.g., programming stored on a medium, firmware, etc.), hardware, or a combination thereof. In the preferred embodiments, the image capture logic 31 is implemented in software as an executable program, and is executed by a special or general purpose digital computer, such as a personal computer (PC; IBM-compatible, Apple-compatible, or otherwise), workstation, minicomputer, or mainframe computer. An example of a general-purpose computer that can implement the image capture logic 31 of the preferred and alternate embodiments of the present invention is shown in FIG. 2.

Generally, in terms of hardware architecture, as shown in FIG. 2, the digital computer can comprise the computing devices 14, 26 and/or the image capture device 12, and includes, inter alia, a processing device 28 and memory 30. Input and/or output (I/O) devices 36 (or peripherals) can be communicatively coupled to a local interface 34. The local interface 34 can be, for example but not limited to, one or more buses or other wired or wireless connections, as is known in the art. The local interface 34 may have additional elements, which are omitted for simplicity, such as controllers, buffers (caches), drivers, repeaters, and receivers, to enable communications. Further, the local interface 34 may include address, control, and/or data connections to enable appropriate communications among the aforementioned components.

The processing device 28 is preferably a hardware device for executing software, particularly that stored in memory 30. The processing device 28 can preferably be any custom made or commercially available processor, a central processing unit (CPU), an auxiliary processor among several processors associated with the computing devices 14, 26, a semiconductor based microprocessor (in the form of a microchip or chip set), a macroprocessor, or generally any device for executing software instructions.

The memory 30 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 30 may incorporate electronic, magnetic, optical, and/or other types of storage media. Note that the memory 30 can have a distributed architecture, where various components are situated remote from one another, but can be accessed by the processing device 28.

The software and/or firmware in memory 30 may include one or more separate programs, each of which comprises an ordered listing of executable instructions for implementing logical functions. In the example of FIG. 2, the software in the memory 30 includes the image capture logic 31 and a suitable operating system (O/S) 32. The operating system 32 essentially controls the execution of other computer programs, such as the image capture logic 31, and provides scheduling, input-output control, file and data management, memory management, and communication control and related services.

The image capture logic 31 is preferably a source program, executable program (object code), script, or any other entity comprising a set of instructions to be performed. When the image capture logic 31 is implemented as a source program, then the program needs to be translated via a compiler, assembler, interpreter, or the like, which may or may not be included within the memory 30, so as to operate properly in connection with the O/S 32. Furthermore, the image capture logic 31 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 36 may preferably include input devices, for example but not limited to, a keyboard, mouse, scanner, microphone, etc. Furthermore, the I/O devices 36 may also include output devices, for example but not limited to, a printer, display, etc. Finally, the I/O devices 36 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

When the image capture logic 31 is implemented in software, as is shown in FIG. 2, it should be noted that the image capture logic 31 can preferably be stored on any computer-readable medium for use by or in connection with any computer related system or method. The image capture logic 31 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. If implemented in hardware, as in an alternative embodiment, the image capture logic 31 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 3:
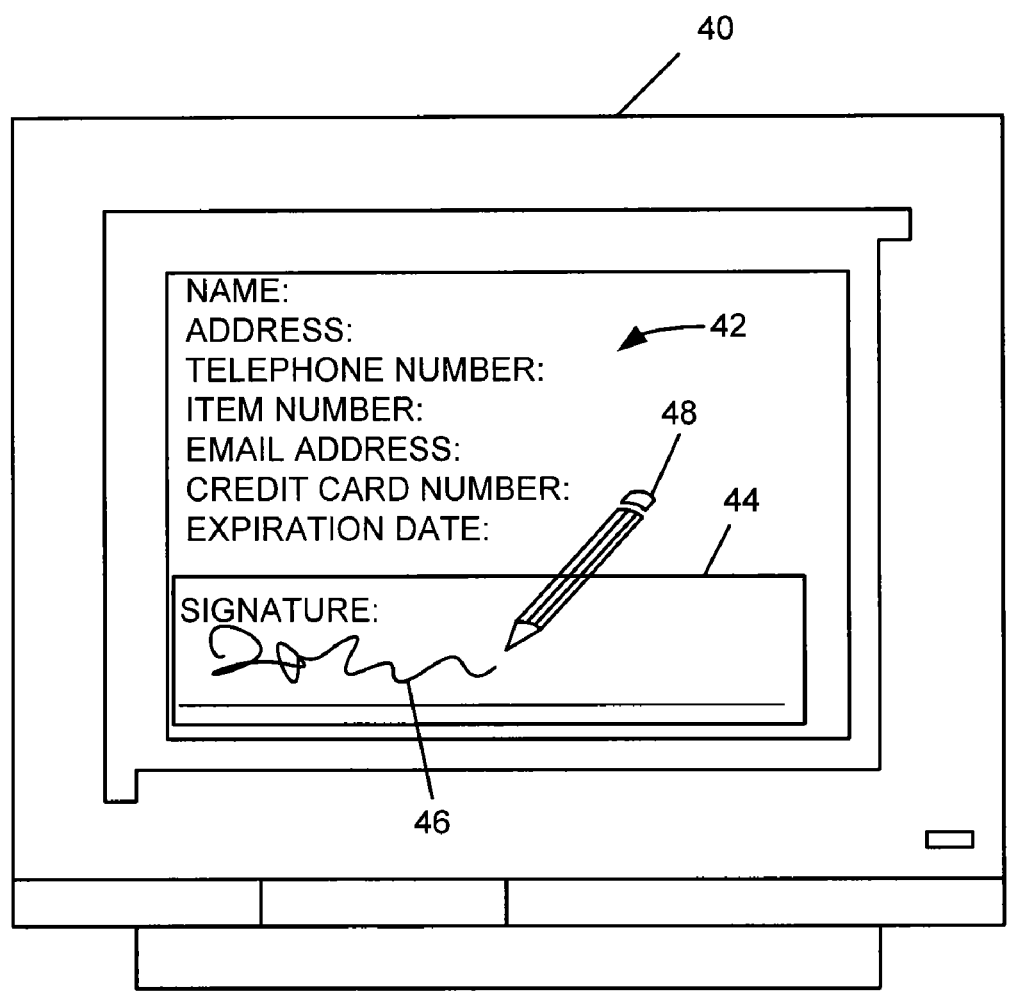
FIG. 3 is a block diagram depicting a preferred embodiment of the identity capture device of FIG. 1 embodied as a display device.

FIG. 3 shows a block diagram of a preferred embodiment of an identity capture device 12 embodied as a display device 40. In one embodiment, the display device 40 is a touch sensitive computer monitor. The display device of FIG. 3 can preferably be utilized in a number of transactions including one where a purchaser provides data such as credit card information 42 to a seller. The credit card information 42 can include, but is not limited to, the purchaser's name, address, telephone number, item number, email address, credit card number, and expiration date for credit card.

A signature window 44 is also positioned on the display device 40. In one embodiment, the signature window 44 comprises a touch sensitive pad as is well known in the art. The purchaser typically signs his/her name in the signature window 44 using a writing instrument, for instance a stylus 48. The authenticity of a resulting signature 46 can be verified by comparing, through known pattern recognition methods, the signature 46 to one in the database 16 (FIG. 1) that is associated with the purchaser's credit card. The seller will receive notification on the computing device 14, which is typically co-located with the display device 40, regarding whether the signature 46 is authentic.

Figure 4:
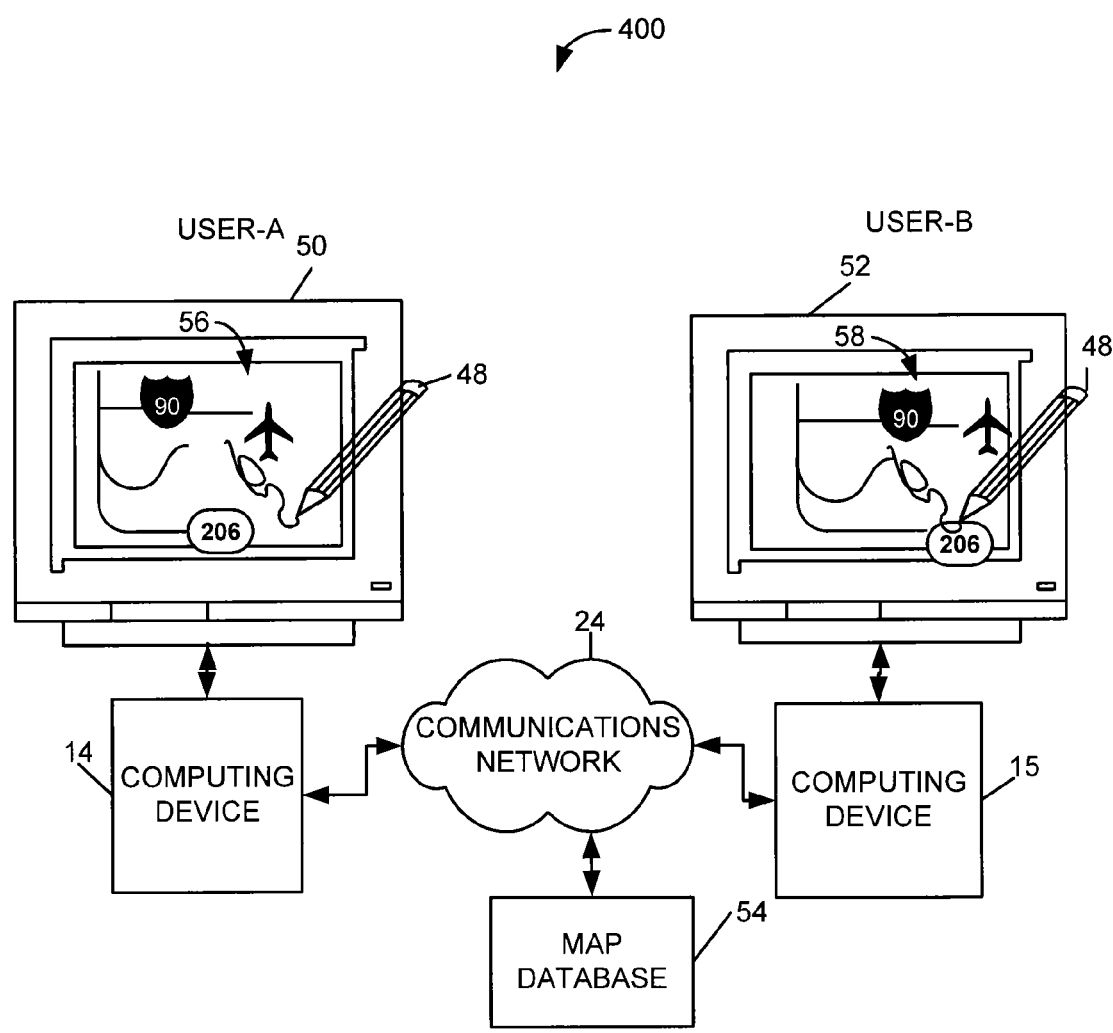
FIG. 4 is a block diagram depicting another preferred embodiment of an image capture system.

FIG. 4 shows a block diagram of another preferred embodiment of an image capture system 400. This embodiment provides for two users, e.g. User-A and User-B, having a real-time interactive exchange. In the embodiment shown in FIG. 4, User-A requests directional assistance from User-B. The image capture system 400 includes a plurality of identity capture devices, 50, 52, such as display devices, operatively coupled to the computing devices 14, 15. In one embodiment, the computing devices 14, 15 couple to the communications network 24. A map database 54 is accessible to User-A and User-B via the communications network 24. In an alternative embodiment, the computing devices 14, 15 are directly connected to each other and the map database 54 is incorporated in the computing devices 14, 15. In yet another embodiment, the computing devices couple directly to the map database 54.

Information retrieved from the map database 54 can be displayed on each of the display devices 50, 52. Alternatively, information retrieved from the map database 54 is displayed on only one display device 50 or 54. In a preferred embodiment, the display device 50, 52 includes a touch-screen. The users can communicate with each other to request clarifying information. They may communicate using a traditional telephone service, electronic mail, or via an instant messaging service provide by Internet Service Providers (ISPs) as is well known in the art. A stylus 48 can be used to write on the screen of the display device 50, 52. The information written on the screen is transmitted to the computing device 14, 15 using the communications network 24 and received by the other user.

Figure 5:
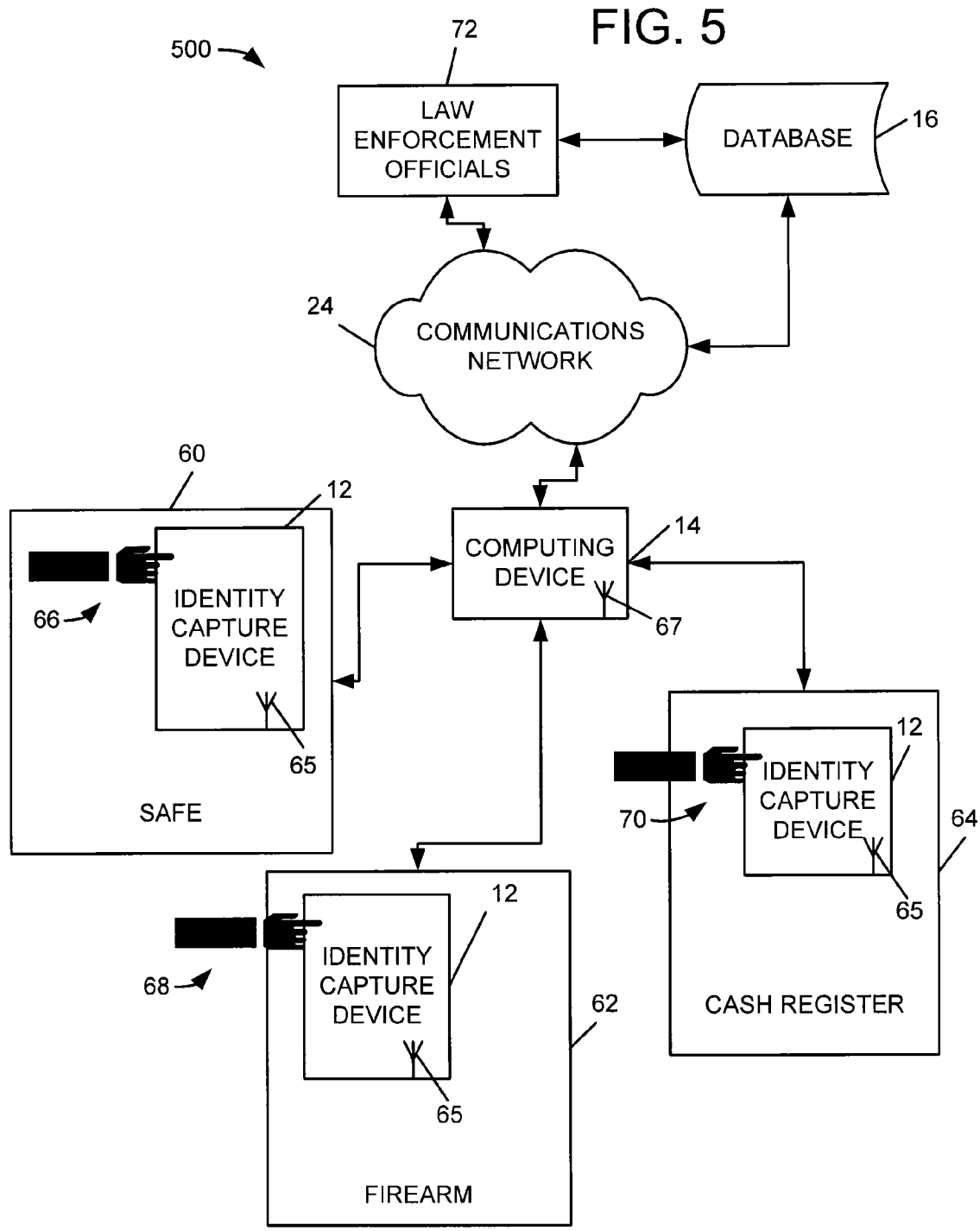
FIG. 5 is a block diagram depicting another preferred embodiment of an image capture system.

FIG. 5 shows a block diagram of another preferred embodiment of an image capture system 500. The image capture system 500 includes the identity capture device 12 affixed to an article to be monitored such as, for instance, a safe 60, a firearm 62, and a cash register 64, among many others. The identity capture device 12 will be strategically placed on the monitored article in a location typically touched by an individual, such as an intruder. Upon touching the identity capture device 12, an image of the fingerprint, or thumbprint, 66, 68 and 70 is captured and sent via the transmitter 65 to the computing device 14. The image is received by a receiving device 67 coupled to the computing device 14.

The computing device 14 utilizes the communications network 24 to connect to the database 16. The database 16 contains authentication information, including fingerprint and thumbprint information. The computing device 14 searches the database 16 for a fingerprint or thumbprint that matches the image sent from the image capture device 12. If a match occurs, the proper law enforcement officials 72 can be notified directly by the computing device 14 or via other methods such as by telephone or email. If a match does not occur, the image can be stored in the database 16 for future use.

Figure 6:
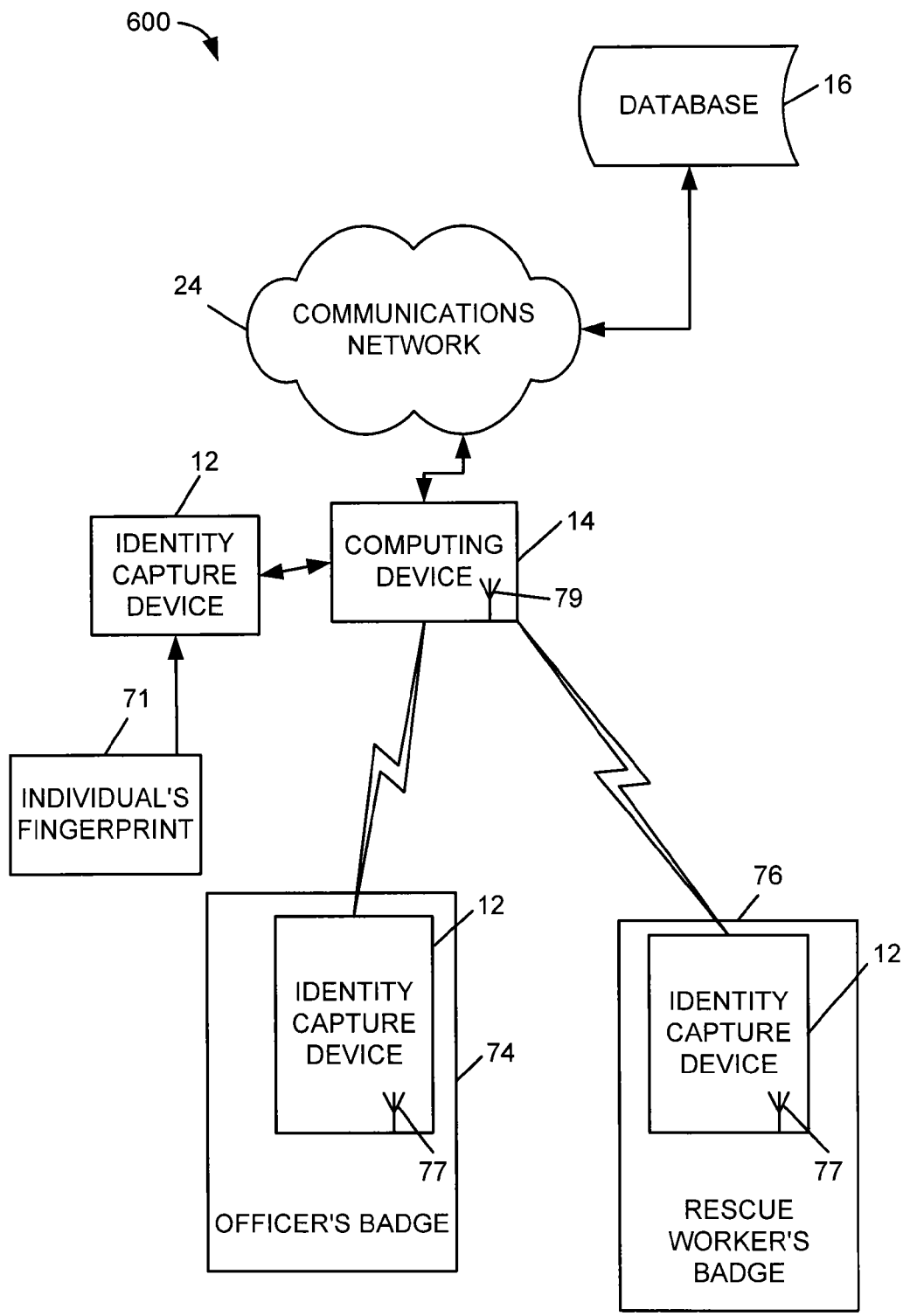
FIG. 6 is a block diagram depicting another preferred embodiment of an image capture system.

FIG. 6 shows a block diagram of another preferred embodiment of an image capture system 600. Badges 74, 76, such as a law enforcement officer's badge 74 or a rescue worker's badge 76 having the identity capture device 12 affixed thereon couples to the computing device 14. Identifying information, such as fingerprints, is stored in the database 16. In an alternative embodiment, the identity capture device 12 includes identifying information associated with the owner of the badge 74, 76.

In the case of an emergency, a law enforcement officer, fireman or emergency medical personnel can touch his/her badge 74, 76 with a finger creating an image. Once the identity capture device 12 is appropriately depressed, the image is sent via the transmitter 77 to the receiving device 79 coupled to the computing device 14. The computing device searches the database 16 for a match. The results can be used to notify superiors of the receipt of the signal from the law enforcement officer, fireman or emergency medical personnel such that appropriate assistance can be provided.

The identity capture device 12 can be affixed to a virtually unlimited number of types of devices. For instance, the identity capture device 12 can be placed around a home on various items frequently touched. The database 16 can include a table that correlates the item and the location of the item. Thus, the image capture system 10 can be used to identify the location of the individual based on the location of the item containing the individual's fingerprint 71. In an alternative embodiment, the identity capture device 12 is remotely activated. The identity capture device 12 can be remotely activated by the owner of the badge 74, 76 or by other individuals such as those located in a monitoring center, hospital or police station, among others. Once activated, the identity capture device 12 works in cooperation with a suitable Global Positioning System (GPS) as is known in the art, to locate the owner of the badge 74, 76.

Figure 7:
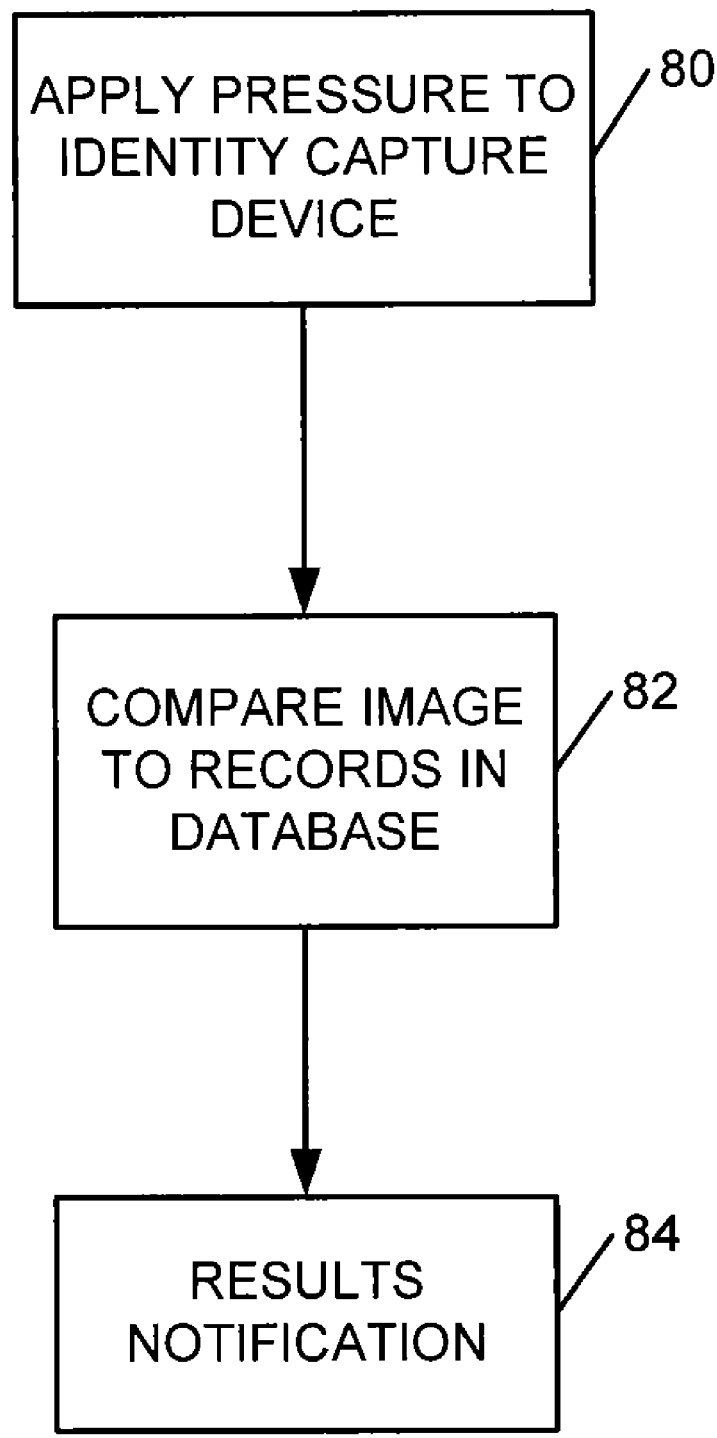
FIG. 7 is a flow chart depicting functionality of a preferred embodiment of an image capture system.

FIG. 7 is a flow chart depicting general functionality of one preferred embodiment of an image capture system. At 80, pressure is applied to the identity capture device. The identity capture device can be depressed in a number of manners including, depression by a fingerprint, thumbprint or a stylus. At 82, the image captured by the identity capture device is compared to records in a database. At 84, a user is notified of the availability of the result of the comparison.

Figure 8:
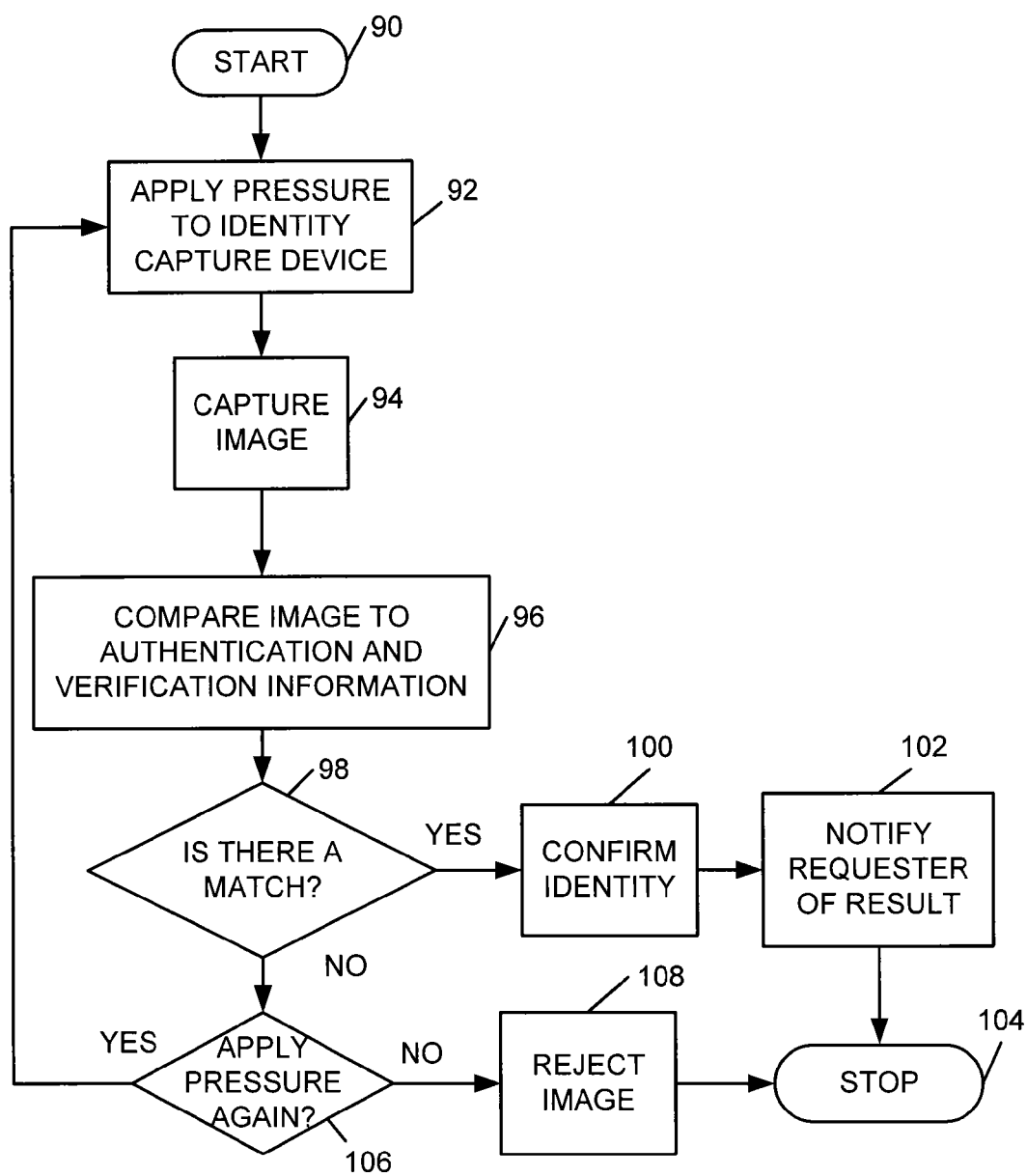
FIG. 8 is a flow chart depicting a preferred embodiment of an image capture system.

FIG. 8 is a flow chart depicting more specific functionality of a preferred embodiment of an image capture system. The process begins at 90. At 92, pressure is applied to the identity capture device. In one embodiment, pressure is applied to the identity capture device by a finger or thumb. In another embodiment, pressure is applied to the identity capture device by a stylus or other writing instrument. At 94, the identity capture device captures an image.

At 96, the image is compared to authentication and verification information. In one embodiment, the authentication and verification information resides in a database accessible by the identity capture device. In another embodiment, the identity capture device includes the authentication and verification information. At 98, a determination is made as to whether there is a match between the image and the authentication and verification information. If yes, at 100, the identity of the image is confirmed. At 102, the person requesting verification of the image is notified of the results. The process stops at 104.

If there is not a match between the image and the authentication and verification information, at 106, a determination is made as to whether the image is to be captured again by re-applying pressure on the identity capture device. If yes, the process continues at step 92. If no, at 108, the image is rejected. The process stops at 104.

Figure 9:
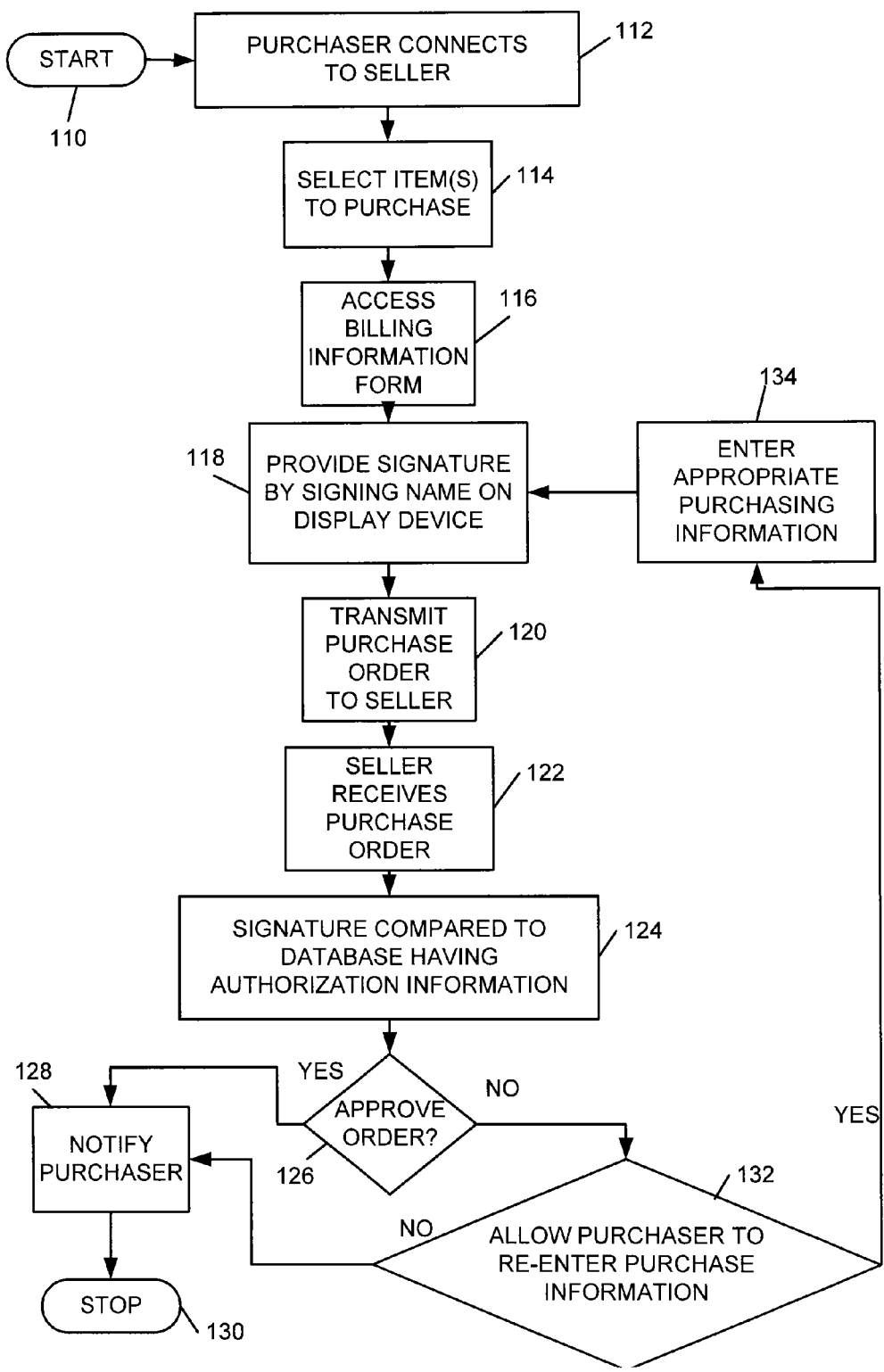
FIG. 9 is a flow chart depicting a preferred embodiment of an image capture system implemented to authenticate and verify a signature.

FIG. 9 is a flow chart depicting another preferred embodiment of an image capture system implemented to authenticate and verify a signature of a purchaser. The process starts at 110. At 112, the purchaser electronically connects to seller. In one embodiment, the purchaser connects to the seller via the Internet. In an alternative embodiment, the purchaser connects a computer directly to the seller's computer. In another alternative embodiment, the purchaser electronically connects a computer to the seller using a communications network.

At 114, the purchaser selects the item(s) to purchase from the seller. At 116, the purchaser accesses the billing section of the seller's data to complete necessary information for paying for the selected item. At 118, the purchaser provides a signature by signing his/her name on the display device. In one embodiment, the display includes a signature window for accepting signatures.

At 120, the purchaser transmits the completed purchase order to the seller. At 122, the seller receives the purchase order. At 124, the seller compares the purchaser's signature to signatures stored in a database having authorization information. If the signature can be authenticated and verified, at 126, the seller approves the order. At 128, the seller notifies the purchaser that the purchase has been approved. The process stops at 130.

If the seller does not approve the order, at 132, the seller determines whether to allow the purchaser to re-enter the purchase information. If yes, at 134, the purchaser enters the appropriate purchasing information necessary to complete the purchase order. The process continues at 118, with the purchaser providing his signature. If the seller does not allow the purchaser to re-enter the purchase information, the purchaser is notified at 128, and the process stops at 130.

Figure 10:
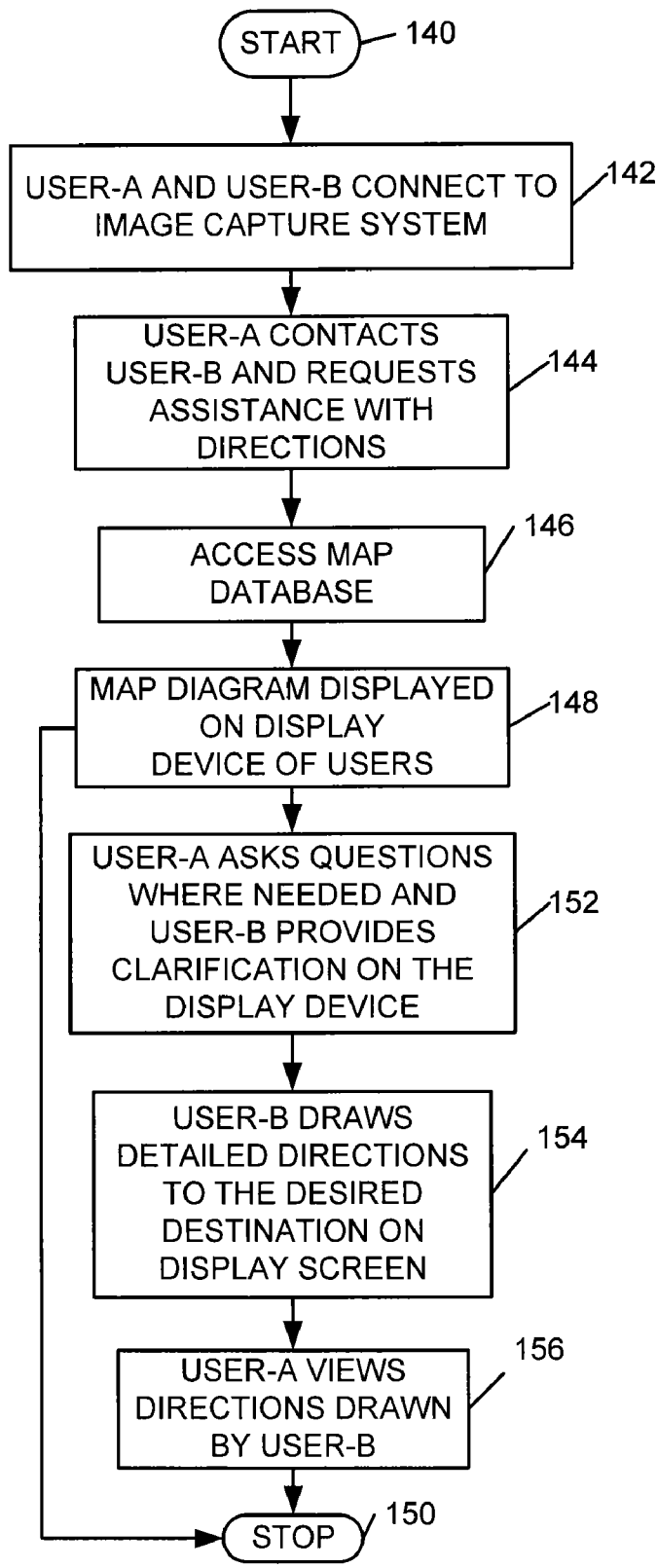
FIG. 10 is a flow chart depicting a preferred embodiment of an image capture system implemented to provide directional information.

FIG. 10 is a flow chart depicting a preferred embodiment of functionality for the image capture system 400 of FIG. 4 implemented to provide directional information. The process begins at 140. At 142, a plurality of users for instance, User-A and User-B, connect to the image capture system. In a preferred embodiment, the image capture system includes a display device having a touch screen and a writing instrument, such as a stylus. At 144, User-A contacts User-B and requests assistance with directions. In one embodiment, User-A contacts User-B using a telephone. In another embodiment, User-A contacts User-B using electronic mail. In yet another embodiment, User-A contacts User-B by writing the request on the display device.

At 146, the users access the map database. At 148, a map is displayed on the display device of both users. If the directions are clear the process stops at 150. If User-A needs clarifying information, at 152, User-A asks questions and User-B provides clarification on the screen of the display device until User-A has appropriate directions. At 154, User-B draws detailed directions to the desired location for User-A on a screen of the display device. At 156, User-A views the directions drawn by User-B. At 150, the process ends.

FIG. 11 is a flow chart depicting a preferred embodiment of functionality for the image capture system 500 of FIG. 5 implemented to identify an intruder. The process begins at 160. At 162, the identity capture device is affixed to the item being monitored. The monitored item can include, but is not limited to, a safe, a firearm, and a cash register. The identity capture device is positioned on the monitored item such that it is very likely that the intruder will touch that location on the monitored item. At 164, the intruder touches the identity capture device. The image of the intruder is captured at 166. The intruder's image can include, but is not limited to, a fingerprint or a thumbprint.

At 168, the image is sent to a monitoring center. At 170, the image is compared to records stored in a database accessible by personnel at the monitoring center. In an alternative embodiment, the image is compared to records stored in the database without being sent to the monitoring center. At 172, a determination is made as to whether there is a match between the intruder's image and an intruder record stored in the database. If yes, at 174, the appropriate authorities are notified of the identity of the intruder. The process ends at 176. If there is not a match between the intruder's image and a record stored in the database, at 178, the intruder's image is stored as a record in the database for future use. The process ends at 176.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. For instance, the image capture system can include a device for capturing the image of an object, such as a face. The image of the face is displayed on the display devices. A user, such as a surgeon or make-up artist, having a display device with a touch sensitive screen, utilizes a writing instrument to make modifications to the image displayed on the display device. The modified image can be transmitted through the communications network and displayed on a recipient's display device. All such modifications and variations are intended to be included herein within the scope of this disclosure and the present invention and protected by the following claims.

Therefore, having thus described embodiments of the invention, at least the following is claimed:

1. A system for remotely verifying the identity of an unidentified image, comprising:
   an identity capture device affixed to a badge operatively coupled to at least one computing device, the identity capture device adapted to capture the image;
   a transmitting device operatively coupled to the identity capture device for sending the image to the at least one computing device, wherein the at least one computing device attempts to find a match of the image amongst a plurality of records;
   wherein in response to finding the match amongst the plurality of records, the identity capture device provides its location, obtained using a Global Positioning System (GPS), to a monitoring center.

2. The system of claim 1, wherein the identity capture device further comprises a display device.

3. The system of claim 2, wherein the display device is configured to capture the image using a writing instrument that depresses the display device.

4. The system of claim 1, wherein the plurality of records comprises fingerprint records.

5. A non-transitory computer readable storage medium containing a computer program for verifying an unidentified image, the computer readable storage medium when executed by a processor causing the processor to:
   capture the image using an identity capture device affixed to a badge;
   access a database having information for identifying the image;
   compare the image captured by the identity capture device with the information in the database for a plurality of records maintained in the database to attempt to find a match amongst the plurality of records; and
   in response to finding the match amongst the plurality of records, send a location of the badge, obtained using a Global Positioning System (GPS), to a monitoring center.

6. The computer readable storage medium of claim 5, the computer program further causing the processor to notify a user of results of the comparing the image captured by the identity capture device with the information in the database.

7. The computer readable storage medium of claim 5, the computer program further causing the processor to determine whether there is a match between the image and the information in the database.

8. The computer readable storage medium of claim 7, the computer program further causing the processor to confirm an identity associated with the image when a match occurs between the image and the information in the database.

9. The computer readable storage medium of claim 7, the computer program further causing the processor to re-capture the image when a match does not occur between the image and the information in the database.

10. The computer readable storage medium of claim 7, the computer program further causing the processor to reject the image when a match does not occur between the image and the information in the database.

11. The computer readable storage medium of claim 5, wherein capturing the image using an identity capture device comprises applying pressure to the identity capture device by placing a finger on the identity capture device.

12. The computer readable storage medium of claim 5, wherein capturing the image using an identity capture device comprises applying pressure to the identity capture device by writing on the identity capture device using a writing instrument.

13. The computer readable storage medium of claim 12, wherein applying pressure to the identity capture device by writing on the identity capture device using a writing instrument comprises providing a signature by signing a name on a display device.

14. A non-transitory computer readable storage medium containing a computer program for identifying an identity of an unknown person, the computer readable storage medium when executed by a processor causing the processor to:
   sense a touching of an identity capture device affixed to a badge by the unknown person;
   capture an image of the unknown person;
   compare the image to records having identification information stored in a database for a plurality of persons; and
   determine whether a match exists between the image and the records stored in the database and notifying authorities of an identity and a location of the touched identity capture device when a match occurs.

15. The computer readable storage medium of claim 14, wherein the identity capture device is affixed to a monitored device comprising at least one of a safe, firearm, identification card, or cash register.

16. The computer readable storage medium of claim 14, the computer program further causing the processor to transmit a signal containing the image to a receiving device.

17. The computer readable storage medium of claim 14, the computer program further causing the processor to save the image as a record in the database when a match does not occur between the image and the record.

18. The computer readable storage medium of claim 14, wherein capturing the image comprises applying pressure to the identity capture device by placing a finger on the identity capture device.

19. The computer readable storage medium of claim 14 wherein the computer readable storage medium comprises computer memory.

20. The computer readable storage medium of claim 14 wherein the computer readable storage medium comprises a computer diskette.

* * * * *